United States Patent [19]

Vyprachticky

[11] 3,952,992

[45] Apr. 27, 1976

[54] METHOD AND APPARATUS FOR FORMING DECORATIVE INLAYS IN WAX CANDLE WALLS

[75] Inventor: Emil Vyprachticky, Arvada, Colo.

[73] Assignee: Premier Manufacturing Co., Arvada, Colo.

[22] Filed: Jan. 30, 1974

[21] Appl. No.: 437,870

[52] U.S. Cl. .................................. 249/104; 264/247

[51] Int. Cl.[2] ..................... B29C 1/14; B29D 30/100

[58] Field of Search ......................... 249/104, 91, 92; 425/803; 264/250, 247

[56] References Cited

UNITED STATES PATENTS

| | | | |
|---|---|---|---|
| 1,881,817 | 10/1932 | Meyer | 249/104 |
| 3,061,880 | 11/1962 | Weisbach | 425/DIG. 57 |

*Primary Examiner*—Francis S. Husar
*Assistant Examiner*—Robert J. Charvat
*Attorney, Agent, or Firm*—Edwin L. Spangler, Jr.

[57] ABSTRACT

This invention relates to a novel inlay mold for use with a candle mold as a means for inlaying decorative molded wax inserts into one or more exposed faces of the latter while at the same time fusing them together to produce a unitary structure, such accessory including an open-topped shallow marginally-rimmed reservoir shaped to define a decorative insert into which molten wax is poured and allowed to set; and, hook-forming means for suspending said reservoir thus filled with wax in upright position from the rim of a candle mold flush against the wall thereof facing inwardly. The invention also encompasses the method by which decorative inlays are bonded to the exposed wall surfaces of a wax candle which includes the steps of filling a shallow reservoir with molten wax while laying in horizontal position to form an insert, allowing said wax to set, hanging the reservoir in vertical position from the rim of a candle mold flush against a wall thereof and with the insert facing inwardly, pouring molten wax into the candle mold up to a level at least covering the reservoir, allowing the wax in the candle mold to set and fuse to the adjoining opposed face of insert, removing the candle and inlay thus formed together with the reservoir through the open top of the candle mold as a unitary assembly, and stripping the reservoir from the wall of the candle.

2 Claims, 5 Drawing Figures

METHOD AND APPARATUS FOR FORMING DECORATIVE INLAYS IN WAX CANDLE WALLS

The ancient art of candle making has, in recent years, enjoyed increased popularity with both the amateur and semiprofessional. The amateur especially has found candle making to be a creative and rewarding hobby as witnessed by the ever increasing sales of home candle making kits and supplies. The challenge and fun is derived, of course, from making candles in many unusual and decorative shapes and colors.

Some of the finest examples of the candle making art are those in which the surface of the candle is overlaid in some fashion with relief decoration, often in a different color. This is usually accomplished with an expensive two section separable mold which is used to produce the decoration at the same time the main candle is being fashioned. Thereafter, the decoration is hand painted. Molds of this type are expensive and possess little versatility, especially for the hobbyist. A need exists, therefore, for an inexpensive and simple way to inlay the surface of a candle with one or more decorative inserts which may be the same or, preferably, a different color from the main candle.

It has now been found in accordance with the teaching of the instant invention that a way does, in fact, exist for inlaying candle walls with decorative inserts that is simple enough for any amateur to use, very inexpensive and yet possesses a great deal of versatility. Each inlay mold is shaped to produce a different decorative insert and it may be used alone, in combination with one or more others of the same or different shapes at will. In general, the inlay molds are compatible with any open-topped candle mold having parallel or upwardly divergent side walls.

The method of using the inlay mold is exceedingly simple, yet unobvious, and it results in an inlaid insert permanently fused into the adjacent wall of the candle as an integral part thereof. The insert can, of course, be formed from a different color wax than the main candle and, if desired, it can have additional coloring added thereto by hand painting in accordance with the well-known practice heretofore used in decorating candles.

It is, therefore, the principal object of the present invention to provide a novel and improved method and apparatus for inlaying decorative inserts into the wall of a candle.

A second objective is to provide an insert-forming accessory which is fully compatible with most candle molds as a means for inlaying the surfaces of candles molded in the latter.

Another object of the within described invention is to provide a method for inlaying decorative inserts into the walls of wax candles which requires no special training or skill and is, therefore, well within the ability possessed by the average hobbyist.

Still another objective of the within described invention is the provision of an insert molding apparatus for inlaying candles that can be fabricated to produce a wide variety of decorative inserts of different shapes, sizes and internal configurations.

An additional object is to provide a candle wall inlaying method that results in the decorative insert being fused into the candle wall thus producing an integral unit.

Further objects are to provide an insert mold for inlaying candles which is simple, inexpensive, easy to use, versatile, compact, lightweight and decorative in appearance.

Other objects will be in part apparent and in part pointed out specifically hereinafter in connection with the description of the drawings that follows, and in which.

Figure 1:
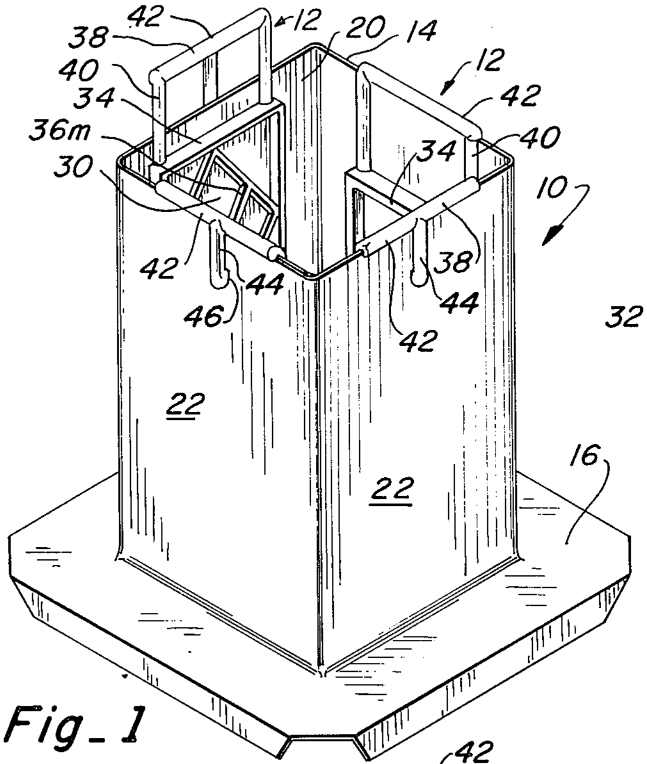
FIG. 1 is a perspective view showing a conventional open-topped candle mold fitted with one of the inlay molds at each side wall as the assembly would be seen from a vantage point above one corner thereof.
Figure 2:
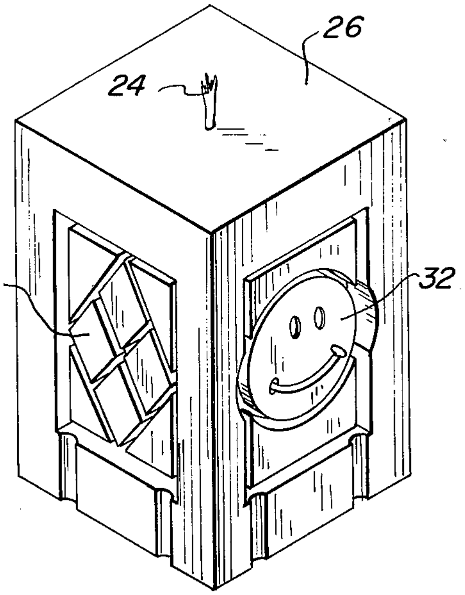
FIG. 2 is a perspective view to the same scale as FIG. 1 showing the resulting inlayed candle as seen from a similar vantage point shifted approximately a quarter turn clockwise.
Figure 4:
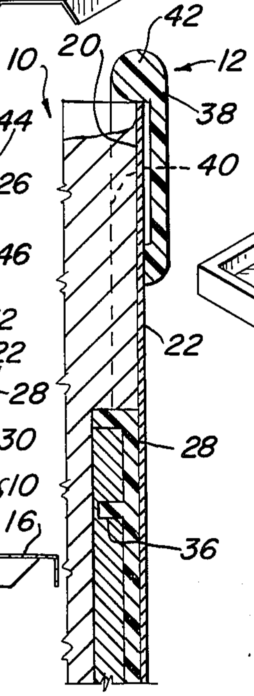
Figure 5:
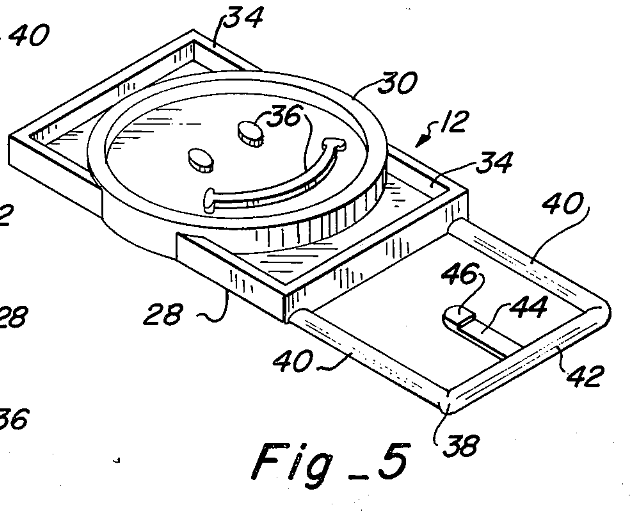

FIG. 4 is a greatly enlarged fragmentary section showing the way in which the preformed inserts are fused and inlaid into the wall surfaces of the candle while the latter is being formed in the candle mold; and, FIG. 5 is a perspective view to a scale somewhat smaller than FIG. 4 yet larger than FIGS. 1 and 2 showing one of the inlay molds laid flat to receive the molten wax from which the insert is fashioned as seen from a vantage point above and to the right of its upper right hand corner.

Figure 3:
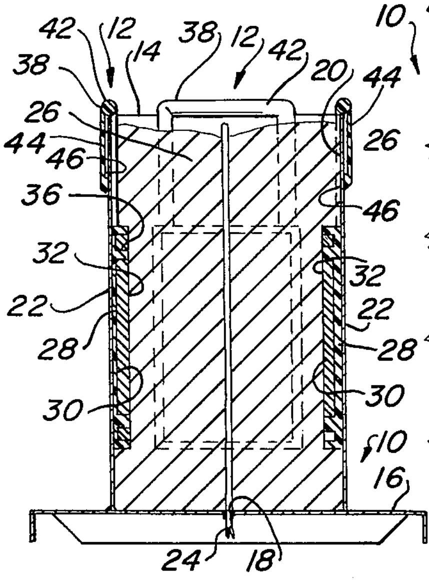
FIG. 3 is a vertical section to a reduced scale showing the entire assembly preparatory to lifting the candle with the inserts inlaid therein from the mold along with the inlay molds.

Referring next to the drawings for a detailed description of the present invention, reference numeral 10 has been chosen to broadly designate a conventional open-topped candle mold and numeral 12 to similarly denominate the inlay molds hung from the rim 14 of the latter. In the particular form illustrated in FIGS. 1 and 3, the candle mold 10 has a base 16 with a hole 18 centered within the cup shaped cavity 20 formed by the upstanding walls 22. A wick 24 projects out the bottom through this hole and defines a plug for the latter while the cavity is being filled with molten wax to fashion candle 26. The enclosed cup-shaped cavity is illustrated as being essentially more or less box like, however, it is by no means limited to such a configuration as it can just as well take many other shapes well known in the art that still permit the candle to be lifted free through the open top thereof. Likewise, while the inlay molds 12 have been shown to have outer surfaces 28 shaped to fit flush against the planar inside surfaces of walls 22 and keep the molten wax from passing therebetween, these same outer surfaces can be shaped, without the exercise of invention, to complement and mate in essentially flush sealed relation with other than planar candle mold walls. Candle 26 is, of course, formed upside down in the candle mold by filling the cup-shaped cavity with molten wax in the conventional manner.

With particular reference to FIG. 5, it will be seen that the inlay molds each include a shallow open-topped marginally-rimmed reservoir 30 effective when laid down flat to receive and hold molten wax which, when it hardens, produces a preformed insert 32. In the particular form shown, each of the reservoirs is more or less bordered on all sides by a frame 34 which, while incapable of retaining wax due to the lack of a bottom, nevertheless produces an indented border framing the insert and setting same off in relief. Obviously, such a frame is of no significance whatsoever in inlaying the insert 32 and it can, therefore, be done away with altogether as far as the latter is concerned. Within the marginal rim surrounding each reservoir can be placed various decorative indicia 36 such as, for example, the mouth and eyes of FIG. 5. It should be noted that such interior indicia 36 can also take the form of partition walls 36M (FIG. 1) that divide the large diamond-shaped area into four smaller ones, each defining a smaller diamond-shaped reservoir. As such, the several reservoirs can be filled with different colors of wax or, perhaps, even left unfilled in which event the wax forming the candle itself will fill same. The latter procedure negates the prime purpose of the inlay mold, namely, the inlaying of decorative inserts; however, under some circumstances it can be useful as in changing the pattern of the inlay with a single inlay mold by selecting certain reservoirs 30 from among several available to prefill with molten wax differing in color from that of the candle itself.

The remaining feature common to all of the inlay molds is the hanger 38 by means of which the reservoir is hung from the rim 14 of the candle mold in flush relation against the inside wall thereof. In the particular form illustrated, this hanger includes an inverted, generally U-shaped bail element 40, the crossbar portion 42 of which is outwardly offset so as to overhang the rim of the mold 10 and keeps the reservoir suspended therebeneath from tilting. By exercising extreme care in the pouring of the molten wax into the candle mold 10 it is, undoubtedly possible to keep the inlay molds from tilting or otherwise shifting out of position, however, the procedure is greatly simplified by hanging the reservoir from the rim in such a way that one long or two or more longitudinally spaced overhanging portions rest atop the mold rim to keep it from tilting.

Extending downwardly along the outside of the mold wall from a point intermediate the ends of the crossbar of the bail is a hook-forming member 44 having a foot 46 on its free end. This hook-forming member cooperates with the parallel uprights of the bail 38 on opposite sides thereof to define a hook adapted to hang the reservoir down inside the candle mold flush against a wall thereof with the wax-receiving opening in the latter facing inwardly. Also, by locating the hook-forming element in between the uprights rather than opposite one of them, it can be formed with a slight inward tilt such that it has to be sprung outwardly a slight amount to pass into the outside of the mold wall. When this is done, the foot 46 is preloaded against the outside of the mold wall which functions to draw the outer surface of the reservoir out into flush essentially sealed engagement with the inside surface of the mold. This same preload bias on the hook-forming element creates additional friction that helps to prevent the inlay molds and inserts contained therein from rising as they tend to float on top of the molten wax centering the candle mold.

By thus hanging the inlay molds from the rim of the candle mold, the open top of the latter is left completely unobstructed to receive the molten wax. Once the candle has hardened, it can be raised out of the mold along with the inserts inlaid into its wall surfaces and the inlay molds which merely unhook from the rim once the foot of the hook-forming element rises above the latter. With the candle free of the mold, the inlay molds can be stripped from its surface ready for reuse.

While most of the steps in the method have already been alluded to previously, it will be well to go over them again. To begin with, the selected inlay molds are laid flat on a supporting surface and the reservoir 30 thereof filled with molten wax, preferably of some different color than that of which the candle itself is to be molded. Then, when the wax has set in the inlay molds and the preformed inserts are complete, the molds are hung vertically down inside the candle mold from the rim thereof with the bottom of said reservoir flush against the inside wall of the candle mold and the only exposed surface of the insert facing inwardly. Next, the wick is inserted through the bottom of the candle mold and the latter filled with molten wax. As the molten wax contacts the exposed surface of the inserts, it will soften and melt the latter slightly before hardening to produce a fused joint between it and the adjoining candle wall. Since the edges and decorated surface of the inserts are covered and insulated from the hot molten wax by the rim and bottom of the reservoir, and the hot wax is effectively prevented from reaching the bottom of the reservoir anyway, only the exposed surface melts and becomes bonded to the candle wall thus resulting in a unitary structure. After the candle has hardened, it is lifted out of the open top of the candle mold bringing with it the inserts fused and inlaid into its surface and the inlay molds still attached. Once free of the candle mold the inlay molds can be stripped and cleaned for reuse.

What is claimed is:

1. The inlay mold for use in inlaying wax inserted into the wall of a candle which comprises: an open-topped shallow marginally-rimmed reservoir adapted to receive molten wax poured therein and retain same until it hardens to form a wax insert, the underside of said reservoir being shaped to form an essentially wax tight seal with an upstanding wall of a candle mold when placed thereagainst; and, hanger means associated with said reservoir for hanging same against the wall thereof opening inwardly including an inverted generally U-shaped bail having the crossbar thereof provided with horizontally-spaced portions overhanging the rim of the candle mold cooperating therewith to prevent the reservoir from tilting from side to side and hook-forming means depending from said crossbar of the bail intermediate the upright portions at opposite ends of the latter, said hook-forming means defining a spring preloaded to press against the outside of the candle mold wall and normally hold the reservoir in wax tight sealed engagement thereagainst.

2. The inlay mold as set forth in claim 1 in which: the hook-forming means and portions of the bail alongside thereof cooperate with one another to grip the mold wall therebetween with sufficient force to resist the tendency of the reservoir to become dislodged in the presence of the molten wax entering the candle mold.

* * * * *